(12) United States Patent
Malgorn et al.

(10) Patent No.: US 7,422,119 B2
(45) Date of Patent: Sep. 9, 2008

(54) CYLINDRICAL ELEMENT WITH SLOPING FINS FOR FILTERING ELEMENT AND CORRESPONDING FILTERING ASSEMBLY

(75) Inventors: Gerard Malgorn, Quimper (FR); Gildas LeMen, Quengat (FR)

(73) Assignee: Fleetguard, Inc., Quimper (FR)

( * ) Notice: Subject to any disclaimer, the term of this patent is extended or adjusted under 35 U.S.C. 154(b) by 75 days.

(21) Appl. No.: 10/472,831

(22) PCT Filed: Mar. 15, 2002

(86) PCT No.: PCT/FR02/00942

§ 371 (c)(1),
(2), (4) Date: Feb. 23, 2004

(87) PCT Pub. No.: WO02/076569

PCT Pub. Date: Oct. 3, 2002

(65) Prior Publication Data

US 2004/0129629 A1 Jul. 8, 2004

(30) Foreign Application Priority Data

Mar. 23, 2001 (FR) .................................. 01 03990

(51) Int. Cl.
*B01D 29/19* (2006.01)
*B01D 29/13* (2006.01)

(52) U.S. Cl. ...................... 210/437; 210/472; 210/483; 210/457

(58) Field of Classification Search ................. 210/436, 210/437, 438, 457, 497.01
See application file for complete search history.

(56) References Cited

U.S. PATENT DOCUMENTS

| 2,843,269 | A | * | 7/1958 | Dudinec | 210/437 |
|---|---|---|---|---|---|
| 3,662,893 | A | | 5/1972 | Humbert, Jr. | 210/315 |
| 4,427,547 | A | * | 1/1984 | Miller et al. | 210/411 |
| 4,442,004 | A | * | 4/1984 | Smith et al. | 210/448 |
| 4,518,501 | A | * | 5/1985 | Lennartz et al. | 210/411 |
| 5,102,541 | A | * | 4/1992 | Breitbach | 210/232 |
| 5,419,373 | A | * | 5/1995 | May | 138/108 |
| 6,036,853 | A | * | 3/2000 | Spencer | 210/167.12 |
| 7,059,481 | B2 | * | 6/2006 | Kochert et al. | 210/437 |

FOREIGN PATENT DOCUMENTS

| DE | 44 30 341 | 3/1995 |
|---|---|---|
| DE | 199 30 292 | 1/2001 |
| EP | 0 713 720 | 5/1996 |

* cited by examiner

*Primary Examiner*—Krishnan S. Menon
*Assistant Examiner*—Benjamin Kurtz
(74) *Attorney, Agent, or Firm*—Krieg DeVault LLP

(57) ABSTRACT

The invention concerns the designing and production of filtering assemblies used for filtering liquids circulating in engines or hydraulic equipment. The invention is characterized in that a cylindrical element designed to support a filtering cartridge in a filtering assembly for liquid circulating in an engine or a hydraulic equipment, the cartridge including a filtering medium delimited by two plates, comprises at least two longitudinal ribs wherefrom extend a series of sloping pins.

12 Claims, 3 Drawing Sheets

Figures 1, 2:
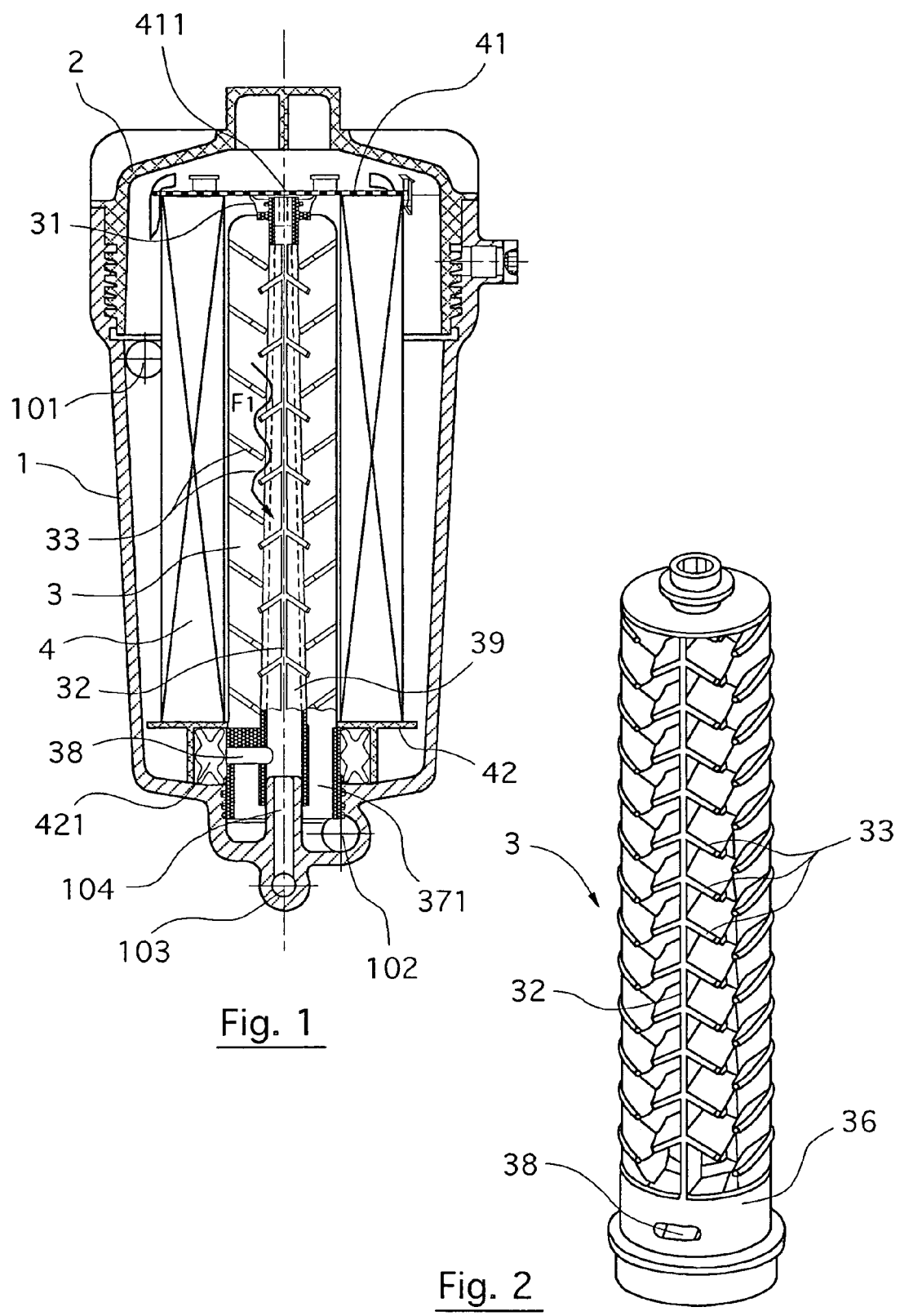

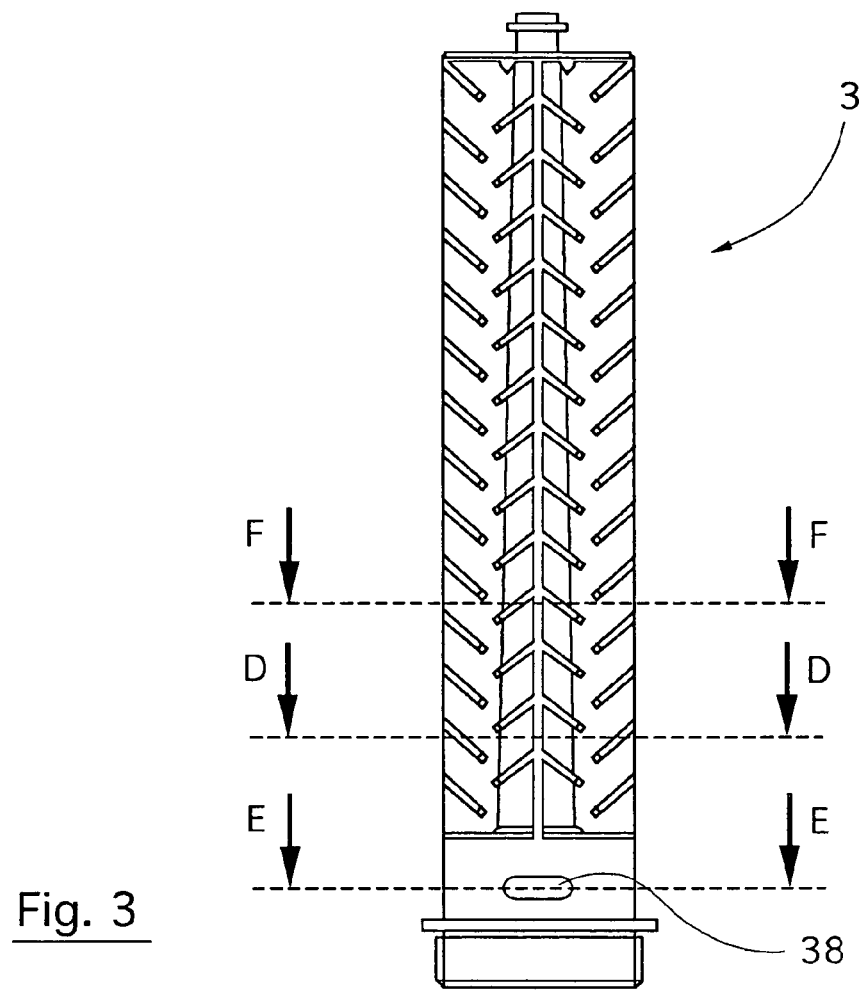
Fig. 3
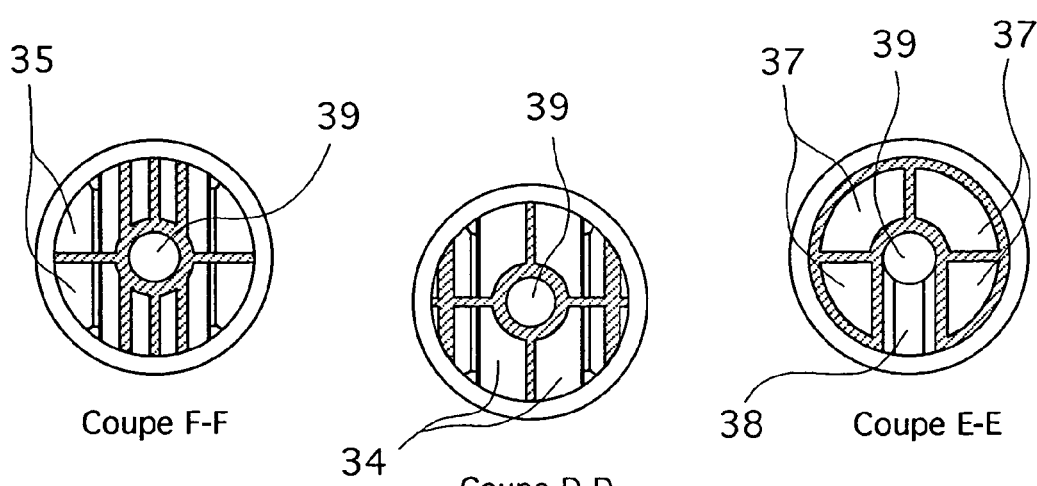
Coupe F-F
Fig. 4
Coupe D-D
Fig. 5
Coupe E-E
Fig. 6

CYLINDRICAL ELEMENT WITH SLOPING FINS FOR FILTERING ELEMENT AND CORRESPONDING FILTERING ASSEMBLY

The invention relates to the field of design and implementation of filtering assemblies used to filter liquids circulating in engines or hydraulic equipment.

Such filtering assemblies are constituted of a filtering body within which is placed a filtering cartridge, which is generally in cylindrical form and which possesses a filtering medium, that can be for example made of paper, cardboard or even felt. This filtering medium is classically bound by two outer flanges.

Such filtering cartridges generally work with a central tube, whether that be integral or not with the flanges, whose outer diameter is nearly the same as the inner diameter of the filtering medium so as to limit the deformation of the medium due to the pressure applied inside the filtering assembly.

The lower flanges can extend thus providing means of positioning and holding in place the cartridge inside the filtering assembly. Alternatively, there exist filtering assemblies that include a support tube onto which the filtering cartridge is fitted, the tube being permanently mounted in the filtering assembly.

In this second instance, there notably exist, according to document DE -44 30 341, filtering assemblies that include a support tube with an irregular helical rib. In addition, this tube has several orifices on its upper part to collect the filtered fluid and channel it through the internal pipe of the tube towards an evacuation pipe for the filtered fluid laid at the base of the filtering assembly.

Such a tube has several drawbacks.

In particular, during the fitting of the filtering cartridge onto the support tube already fitted to the filtering assembly, the rib in the tube creates a resistance to the inserting of the tube when the latter passes inside the pre-fitted joint on the lower flange of the cartridge. This also applies when extracting the cartridge so as to replace it.

Secondly, the evacuation of the filtered liquid is only possible via the orifices made in the upper part of the tube. The filtered liquid reaching the base of the tube must therefore follow the helical path to rise up to the orifices. As the evacuation is not possible along the entire height of the tube, the pressure on the inside of the filtering assembly has a tendency to increase, to the detriment of the service life of the filtering cartridge, even, in time, the quality of filtration.

The purpose of the invention is notably to compensate for the inconveniences of the prior state of the art.

More precisely, the purpose of the invention is to provide a cylindrical element designed to support and hold in place a filtering cartridge, this cylindrical element facilitating the fitting and the retraction of the cartridge on the inside of a filtering assembly.

The purpose of the invention is also to offer such an element which favours the run-off of the filtered liquid towards the evacuation pipe of the filtering assembly, this being practically along the entire height of the filtering assembly.

Another purpose of the invention is to offer such an element which favours the back-flow of the liquid, at the time of replacing the cartridge, towards the liquid reservoir.

The purpose of the invention is also to provide such an element which allows the filtering element to be ventilated during the filling of the filtering assembly with liquid.

Still another purpose of this invention is to offer such an element that can be easily manufactured and mass-produced.

These different objectives as well as others which will be presented later are achieved via a cylindrical element designed to support a filtering cartridge in a filtering assembly for liquid circulating in an engine or hydraulic equipment, the said cartridge comprising a filtering medium bound by two flanges. According to the invention, the cylindrical element comprises at least two longitudinal ribs from which extend a succession of sloping fins in the direction of run-off of the filtered liquid.

Contrary to the prior art, such a configuration of the fins favours, or at least facilitates, the insertion of the cylindrical element into the filtering cartridge, or its retraction. Indeed, the pre-fitted joint on the lower flange of the cartridge is, during the fitting or the removal of the cartridge, permanently held against the ribs and at least two of the fins of the tube.

It will be noted that the ribs and/or fins can extend over all or part of the height of the cylindrical element.

Preferably, the said fins are sloped in the run-off direction of the filtered liquid.

According to an advantageous solution, the said fins are distributed in a symmetrical manner on either side of the said ribs.

According to a preferred solution, the said fins extending from one of the said ribs are placed in staggered rows in relation to the fins extending from a neighbouring rib.

Other embodiments can however be envisaged whilst remaining within the context of the invention, with the fins extending in a non-symmetrical manner, for example in staggered rows, on either side of the ribs.

Additionally, the angle formed between the fins and the ribs can vary, and can notably be adapted according to the number of fins, the number of ribs, the diameter of the cylindrical element or other considerations.

Preferably, the cylindrical element comprises four ribs.

A good distribution of the fins on the surface of the cylindrical element is thus achieved. However, the number of ribs can be adjusted as needs be whilst remaining within the context of the invention.

Advantageously, the cylindrical element comprises at least one evacuation orifice likely to be connected to an outlet pipe for the said filtered fluid laid in the said filtering assembly.

According to an advantageous solution, the cylindrical element comprises at least one drainage hole likely to be connected to a pipe laid in the said filtering assembly for the back-flow of the said liquid to the reservoir of the said engine or of the said hydraulic equipment.

This arrangement proves to be particularly efficient in draining the filtering assembly at the time of replacing the filtering cartridge, when the latter frees the drainage hole.

According to another characteristic, the cylindrical element comprises a central recess opening out at its two ends and thus forming a tube.

A central pipe along the entire length of the tube is thus created, this pipe being or not being connected to other pipes (evacuation of filtered liquid, back-flow to the reservoir, ventilation etc.) according to the required functions.

According to an advantageous solution, the said drainage hole is connected to the said central recess.

A simple and efficient configuration of the cylindrical element is thus achieved.

According to a preferred solution, the said central recess is likely to be connected, on one hand, to a vent made in the upper flange of the said filtering cartridge and, on the other hand, to the said pipe laid in the said filtering assembly for the back-flow of the said liquid to the reservoir of the said engine or of the said hydraulic equipment.

The central pipe of the cylindrical element is thus used to ventilate the filtering assembly, notably operating at the time of filling the filtering assembly with liquid.

Thanks to all of these characteristics, a cylindrical element is thus created which combines three functions: support of the cartridge, ventilation, and drainage of the liquid to be drained.

Preferably, the slope of the fins in relation to the ribs should lie between 30° and 60°.

The invention also relates to a filtering assembly integrating a cylindrical element such as described above and a filtering cartridge comprising a filtering medium bound by two flanges.

Figure 7:
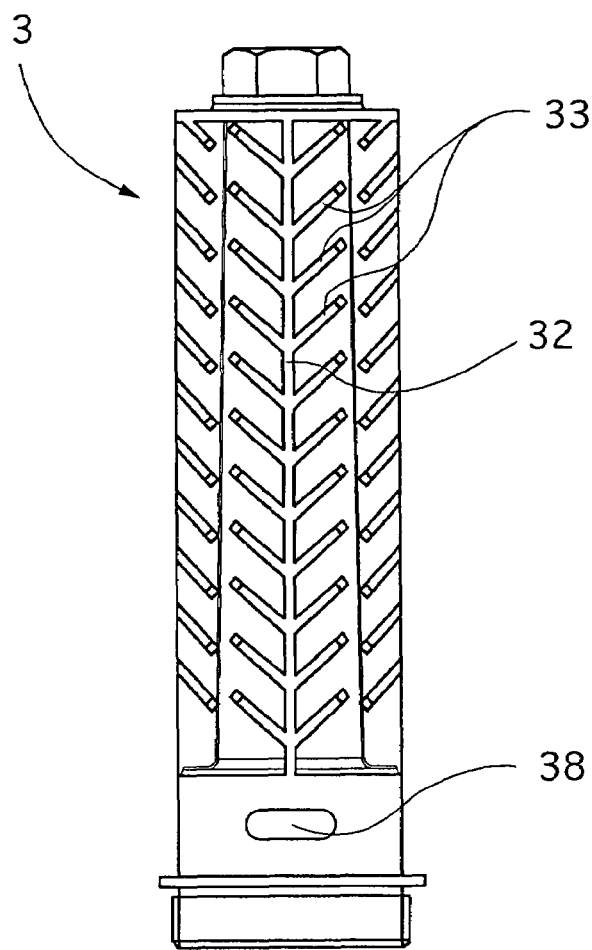
Figure 8:
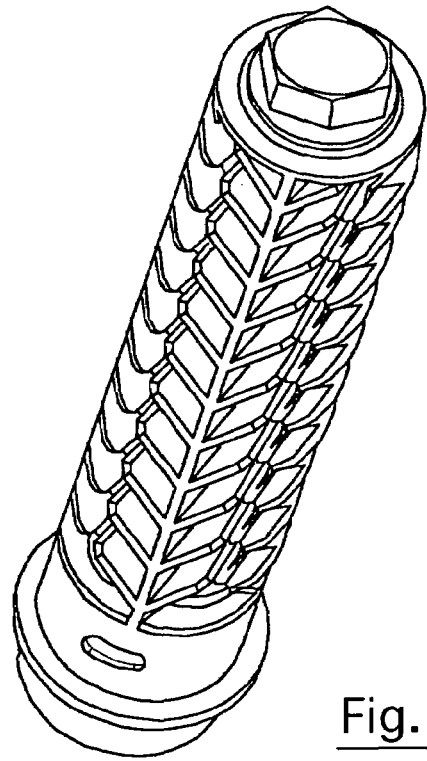

Other characteristics and advantages of the invention will become clearer upon reading the following description of two preferred embodiments of the invention given as non-restrictive illustrative examples, and studying the drawings among which:

FIG. 1 offers a sectional view of a filtering assembly integrating a cylindrical element according to the invention;

FIGS. 2 and 3 respectively offer a perspective and sectional view of a cylindrical element according to an initial embodiment of the invention in which the fins extend downwards from the ribs;

FIGS. 4 and 5 respectively offer views along section F-F and D-D of the cylindrical element illustrated in FIG. 3;

FIG. 6 offers a view along section E-E of the cylindrical element illustrated in FIG. 3;

FIGS. 7 and 8 respectively offer a sectional view and a perspective view of a cylindrical element according to a second embodiment of the invention in which the fins extend upwards from the ribs.

In reference to FIG. 1, a filtering assembly for liquid circulating in an engine or hydraulic equipment comprises a tank 1 and a lid 2, limiting a volume, inside of which is mounted a cylindrical element 3 forming a tube which supports a filtering cartridge comprising a filtering medium 4 bound by an upper flange 41 and a lower flange 42.

The tank 1 comprises an input orifice 101 for liquid, an orifice 102 of an output pipe of filtered liquid, an orifice 103 of a back-flow pipe to the liquid reservoir.

The cylindrical element 3 is mounted and held at the bottom of the tank by a double annular bond. The filtering cartridge is fitted to the cylindrical element 3 and supported in a leaktight manner to the latter via a joint 31 mounted on one end of the cylindrical element 3 and a joint 421 pre-fitted in a specially designed housing in the lower flange 42.

According to an initial embodiment of the invention, the cylindrical element 3 comprises four ribs 32 from which extend the fins 33 sloping downwards, this sloping corresponding to the run-off direction of the filtered liquid.

The fins extend from the rib forming an angle of approximately 45° (this angle can be different in other embodiments).

The cylindrical element 3 is a single-piece made of plastic or composite (or any other similar material) through a moulding process. According to other possible embodiments, the cylindrical element can be made of other materials, notably metallic (for example, a zinc alloy).

As evidenced in FIGS. 1 and 2, the fins 33 extend symmetrically on either side of the ribs 32, the fins extending from a rib being placed in staggered rows in relation to the fins extending from a neighbouring rib. The filtered liquid thus runs along a sinuous route such as illustrated by the arrow F1, successively passing through the gaps 34, 35 respectively illustrated by FIGS. 5 and 4.

With reference to FIG. 6, the base 36 of the cylindrical element 3 has a section in which four evacuation orifices 37 have been made that are likely to be connected to, via the annular volume 371, the output orifice 102 of the filtered liquid placed in the tank 1.

As represented in FIG. 6, the cylindrical element 3 also has a drainage hole 38 connected, via the pipe 104, to the back-flow orifice 103 to the liquid reservoir. At the time of extracting the filtering cartridge, this drainage hole 38, now free, allows the liquid in the tank 1 to run off until the tank is completely or almost completely empty.

In this embodiment, the orifice 38 opens out into the central recess 39 of the cylindrical element 3. As represented in FIG. 1, this central recess 39, marked out by the dotted lines, opens out at the two ends of the cylindrical element 3.

At the base of the cylindrical element 3, the central recess 39 is connected, on one hand, to the drainage hole 38, and on the other hand, to the pipe 104 that is itself connected to the liquid reservoir.

At the upper end of the cylindrical element 3 the central recess 39 is connected to a vent 411 made roughly in the centre of the upper flange 41.

Thus, during the filling of the filtering assembly with liquid, the air held in the tank passes via the vent 411, then via the central recess 39 to be redirected to the liquid reservoir. The dimensions of the vent 411, of about 0.5 mm, restrict, and render acceptable, the leaking of non-filtered liquid that returns to the reservoir.

According to a second embodiment illustrated in FIGS. 7 and 8, the cylindrical element 3 comprises four ribs 32 from which extend fins 33, sloping upwards.

Other embodiments based on the principles of the cylindrical element that has just been described are of course possible whilst remaining within the context of the invention.

The invention claimed is:

1. Cylindrical element designed to support a filtering cartridge in a filtering assembly for liquid circulating in an engine or hydraulic equipment, the said filtering cartridge comprising a filtering medium (4) bound by two flanges (41, 42), characterised in that it comprises at least two longitudinal ribs (32) extending longitudinally along the cylindrical element, each of the at least two longitudinal ribs having a succession of longitudinally spaced, at least partially radially inwardly sloping fins (33) extending therefrom, wherein a sinuous fluid flow path is formed between the radially inwardly sloping fins and longitudinally sloping fins extending from a neighboring longitudinal rib, the inwardly sloping fins and the longitudinally sloping fins extending along the cylindrical element.

2. Element (3) according to claim 1, characterised in that the said fins (33) are sloped in the run-off direction of the filtered liquid.

3. Element (3) according to claim 1, characterised in that the said fins (33) are distributed in a substantially symmetrical manner on either side of the said ribs (32).

4. Element (3) according to claim 1, characterised in that the said fins (33) extending from one of the said ribs are placed in staggered rows in relation to the fins (33) extending from a neighbouring rib.

5. Element (3) according to claim 1, characterised in that it comprises four ribs (32).

6. Element (3) according to claim 1, characterised in that it comprises at least one evacuation orifice (37) likely to be connected to an outlet pipe (102) for the said filtered fluid laid in the said filtering assembly.

7. Element (3) according to claim 1, characterised in that it comprises at least one drainage hole (38) likely to be connected to a pipe (104) laid in the said filtering assembly for the back-flow of the said liquid to the reservoir of the said engine or of the said hydraulic equipment.

8. Element (3) according to claim 1, characterised in that it comprises a central recess (39) opening out at its two ends.

9. Element (3) according to claim 8, characterised in that the said central recess (39) is likely to be connected, on one hand, to a vent (411) made in the upper flange (41) of the said filtering cartridge and, on the other hand, to the said pipe (104) laid in the said filtering assembly for the back-flow of the said liquid to the reservoir of the said engine or the said hydraulic equipment.

10. Element (3) according to claim 1, characterised in that:
it comprises at least one drainage hole (38) likely to be connected to a pipe (104) laid in the said filtering assembly for the back-flow of the said liquid to the reservoir of the said engine or of the said hydraulic equipment;
it comprises a central recess (39) opening out at its two ends; the same drainage hole (38) is connected to the said central recess (39).

11. Element (3) according to claim 1, characterised in that the slope of the fins (33) in relation to the ribs (32) lies between 30° and 60°.

12. Filtering assembly integrating a cylindrical element (3) according to claim 1 and a filtering cartridge comprising a filtering medium (4) bound by two flanges (41, 42).

* * * * *